(12) United States Patent
Huizing et al.

(10) Patent No.: US 8,184,037 B2
(45) Date of Patent: May 22, 2012

(54) RADAR SYSTEM FOR AIRCRAFT

(75) Inventors: Albert Gezinus Huizing, Voorschoten (NL); Ronald Nikola Huib Willem Van Gent, Soest (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 666 days.

(21) Appl. No.: 11/921,051

(22) PCT Filed: May 31, 2006

(86) PCT No.: PCT/NL2006/000272
§ 371 (c)(1),
(2), (4) Date: Feb. 25, 2009

(87) PCT Pub. No.: WO2006/130004
PCT Pub. Date: Dec. 7, 2006

(65) Prior Publication Data
US 2009/0174590 A1 Jul. 9, 2009

(30) Foreign Application Priority Data
Jun. 1, 2005 (EP) .................................... 05076271

(51) Int. Cl.
*G01S 13/93* (2006.01)
(52) U.S. Cl. ............................. 342/29; 342/36; 342/196
(58) Field of Classification Search .............. 342/29–39, 342/196
See application file for complete search history.

(56) References Cited

U.S. PATENT DOCUMENTS

| 3,714,651 A | 1/1973 | Lyon |
| 3,833,904 A | 9/1974 | Gebhardt et al. |
| 4,184,154 A * | 1/1980 | Albanese et al. ............. 342/107 |
| 4,317,119 A | 2/1982 | Alvarez |
| 5,291,196 A * | 3/1994 | Defour ........................... 340/961 |
| 6,222,480 B1 * | 4/2001 | Kuntman et al. ................ 342/30 |
| 6,404,381 B1 | 6/2002 | Heide et al. |
| 6,538,597 B1 | 3/2003 | Steudel |
| RE39,053 E * | 4/2006 | Rees ................................ 342/29 |
| 7,394,422 B2 * | 7/2008 | Nohmi ........................... 342/107 |
| 7,436,350 B1 * | 10/2008 | Maloratsky et al. ............ 342/30 |
| 7,868,817 B2 * | 1/2011 | Meyers et al. ................. 342/123 |
| 8,090,525 B2 * | 1/2012 | Villiers ......................... 701/120 |
| 2004/0119633 A1 * | 6/2004 | Oswald et al. ................. 342/70 |
| 2008/0055149 A1 * | 3/2008 | Rees et al. ..................... 342/29 |
| 2008/0169962 A1 * | 7/2008 | Rees et al. ..................... 342/29 |
| 2010/0085235 A1 * | 4/2010 | Meyers et al. ................. 342/29 |
| 2010/0265122 A1 * | 10/2010 | Oswald .......................... 342/136 |
| 2011/0298648 A1 * | 12/2011 | Ferro .............................. 342/29 |

FOREIGN PATENT DOCUMENTS

| EP | 0537841 A1 | 4/1993 |
| EP | 0915349 A1 | 5/1999 |
| EP | 1241487 A1 | 9/2002 |
| WO | 00/63720 | 10/2000 |

* cited by examiner

*Primary Examiner* — John B Sotomayor
(74) *Attorney, Agent, or Firm* — Hoffmann & Baron, LLP (57) ABSTRACT

Radar system for providing an aircraft with a facility for in use at least detecting another aircraft in at least one monitorable zone within a region surrounding of that aircraft, wherein the system comprises for each monitorable zone at least one subsystem comprising one transmitter for sending an electromagnetic probe signal and at least one receiver for receiving a reflection of that probe signal, wherein the transmitter is arranged to send the probe signal in a direction that is static with respect to that aircraft.

18 Claims, 5 Drawing Sheets

RADAR SYSTEM FOR AIRCRAFT

This application is the U.S. National Phase of, and Applicants claim priority from, International Application Number PCT/NL2006/000272 filed 31 May 2006 and European Application bearing Serial No. 05076271.5 filed 1 Jun. 2005, which are incorporated herein by reference.

BACKGROUND OF THE INVENTION

The invention relates to a radar system for an aircraft for in use at least detecting another airborne objected within a region surrounding the aircraft.

Such a radar system is known and is used by military aircraft of an air force. The known radar system is capable of searching through a region that extends over a distance of up to 150 nautical miles from an aircraft using that system. The system is used to detect another aircraft as early as possible, not with the aim to avoid a collision, but rather to allow for determining as early as possible whether the detected aircraft is for instance a hostile aircraft that needs to be targeted or an aircraft that can be ignored. The transmitter of the known radar system is capable of transmitting strong signals which reach a long distance and are still detectable after reflection. An antenna of the transmitter may mechanically move, for instance rotate, so as to transmit a signal into all zones of interest by a scanning movement of the antenna. The transmitter may also be arranged to electronically scan all zones of interest without a physical rotation of the antenna itself. However, in both cases zones of interest are within a scan only temporarily addressed. Given the need to scan all the zones of interest, it takes some time to obtain information on the possible presence of another aircraft in the region surrounding the aircraft. This is usually longer than several seconds. As a consequence thereof the known system is for instance unable to replace direct visual inspection of a flight safety volume that surrounds a flying aircraft.

It is an objective of the invention to provide a radar system that is capable of providing feed-back to a pilot in a faster way than the way feed-back is provided by the above-described system of the prior art.

SUMMARY OF THE INVENTION

This objective is achieved with a radar system that according to the invention is a radar system for an aircraft for in use at least detecting another airborne object within a region surrounding the aircraft, wherein the system comprises at least one subsystem comprising: at least one transmitter for transmitting an electromagnetic probe signal; a phased array of receivers for simultaneously receiving reflections of the transmitted probe signal and for generating receiving signals which each represent a received reflection of the probe signal; and a signal processing unit for processing each of the receiving signals for obtaining information about a detected airborne object within the region surrounding the aircraft, wherein the subsystem is arranged to transmit by means of the transmitter the probe signal such that the probe signal covers a zone of interest which is static with respect to the aircraft and wherein the subsystem is arranged to detect by means of the phased array of receivers and the signal processing means an airborne object in the zone of interest. This allows a radar system according to the invention to be developed such that it is capable of replacing a visual inspection.

The signal processing unit may be arranged to determine a direction relative to the aircraft, from which direction the received reflection originates, irrespective of the position of the detected airborne object within the zone of interest. It follows that the signal processing unit may nearly instantaneously determine the direction, thereby obviating the necessity for the receivers to scan the zone of interest, which leads to a slow determination of the direction.

More particularly, the signal processing unit is arranged to use digital multiple beam forming in order to be able to determine the direction relative to the aircraft, from which direction the received reflection originates, which is a very suitable way to arrange the signal processing unit to determine the direction irrespective of the position of the detected airborne object within the zone of interest.

In particular it applies that the at least one subsystem is arranged to transmit the probe signal such that the probe signal continuously covers the zone of interest. This offers the advantage that at all times that zone of interest is monitored for the presence of another airborne device. Such a system is capable of continuously providing information onto a pilot. Hence, the information is provided in a way that is much faster than the way in which known radar systems provide such information.

Nowadays, the safety volume surrounding a flying commercial aircraft is controlled by human air traffic controllers with the aim to avoid collision. These air traffic controllers are provided with information about the presence of aircraft in a predetermined zone of an airspace. This information is based on the detection of air planes via radar systems which are situated on the ground and which monitor the zone of interest. An experienced human air traffic controller is capable of monitoring the flight surrounding of about 30 aircraft at a given moment in time. This has contributed to a maximum number of allowable aircraft in a given zone of the airspace.

Research has shown that the efficiency of an airspace could be improved significantly, if aircraft were themselves capable of safeguarding their separation in a given airspace.

It has been proposed to develop a system in which all aircraft are provided with a transmitter that continuously transmits a signal containing information about its position. When all aircraft are also provided with a receiver for receiving these signals as transmitted by other aircraft, all aircraft should at any time note the position of all other aircraft that are using same airspace. On the basis of this information each aircraft should be capable of avoiding a collision with any other aircraft. A disadvantage of this system is that each aircraft is dependent on other aircraft. This system will only work satisfactorily if all aircraft are equipped with such a system. Hence, such a system cannot gradually be implemented. This seriously inhibits the development of this system.

A radar system according to the invention can for each aircraft be put into practice independently of the time at which the radar system is put into practice for other aircraft.

In fact, as a radar system according to the invention can in principle replace a visual inspection for a zone of interest in a region surrounding an aircraft, such an aircraft may also fly according to visual flight rules under circumstances in which visual flight rules can normally not be applied due to for instance bad weather circumstances. It follows that an aircraft equipped with a radar system according to the invention may for instance be able to land on an airfield that is only approachable on the basis of applying visual flight rules, and thus only when weather circumstances allow for the application of visual flight rules. In other words, a consequence of the invention is that a large number of airfields may now be approachable also when weather circumstances would normally not allow.

Furthermore, because a radar system according to the invention can in principle replace visual inspection, the radar system may suitably be applied on unmanned aircraft. Such unmanned aircraft may even be so well-controlled due to application of the invention, that such aircraft are allowed in regular airspace.

As will be discussed further below, a relative velocity of an aircraft present in the zone of interest and reflecting the probe signal, can be derived from a reception of the reflection of that probe signal.

In an embodiment of a radar system according to the invention the direction of the probe signal is static relative to the aircraft. This ensures that a zone covered by the probe signal has continuously a predetermined shape. The radar system is therefore capable to monitor continuously a zone of interest that is static with respect to the aircraft.

In an embodiment of a radar system according to the invention the at least one subsystem is arranged to transmit the probe signal having a constant frequency. This allows for the detection of an aircraft present in the zone of interest on the basis of the well-known Doppler effect.

In an embodiment of a radar system according to the invention the at least one subsystem is arranged to transmit the probe signal having a Frequency Modulated Continuous Wave (FMCW). This allow for the possibility to determine on the basis of the reflection of the probe signal, a distance of an approaching aircraft present in the zone of interest.

When the probe signal is a frequency modulated continuous wave (FMCW) signal, the distance of the approaching plane can be estimated. When a number so-called FMCW-sweeps are carried out, it is possible to derive the track of the approaching aircraft. It is then possible to calculate the Closest Point of Approach (C.P.A), and the time at which this will occur needed, an anti-collision manoeuvre can be carried out by the pilot.

Preferably the transmitter of the at least one of the subsystems of a radar system according to the invention comprises a solid state transmitter. As opposed to microwaves or tubes, which require a high supply voltage and are generally expensive, solid state transmitters are relatively cheap and can be energized by a relatively low supply voltage.

It is further possible that in an embodiment of a radar system according to the invention each of the receivers of at least one of the subsystems comprise a single chip receiver. Also the use of such single chip receivers allow for a relatively cheap radar system according to the invention. Such single chip receivers are for instance used in portable telecommunication devices such as a mobile phone and in devices which are operational within a wireless LAN network.

In a preferred embodiment of a radar system according to the invention the radar system comprises a plurality of subsystems for monitoring a first zone of interest in front of the aircraft and at least a second zone of interest that is either behind the aircraft, above the aircraft, below the aircraft, or sideways of the aircraft. In other words, it is possible to provide a safety zone in a region surrounding the aircraft so that it covers the most vulnerable zones around an aircraft and in which another aircraft could fly.

This invention is also related to an aircraft provided with such a radar system.

BRIEF DESCRIPTION OF THE DRAWINGS

The invention is further explained on the basis of an exemplary drawing, in which:

In the drawing like parts are provided with like references.

Figure 1:
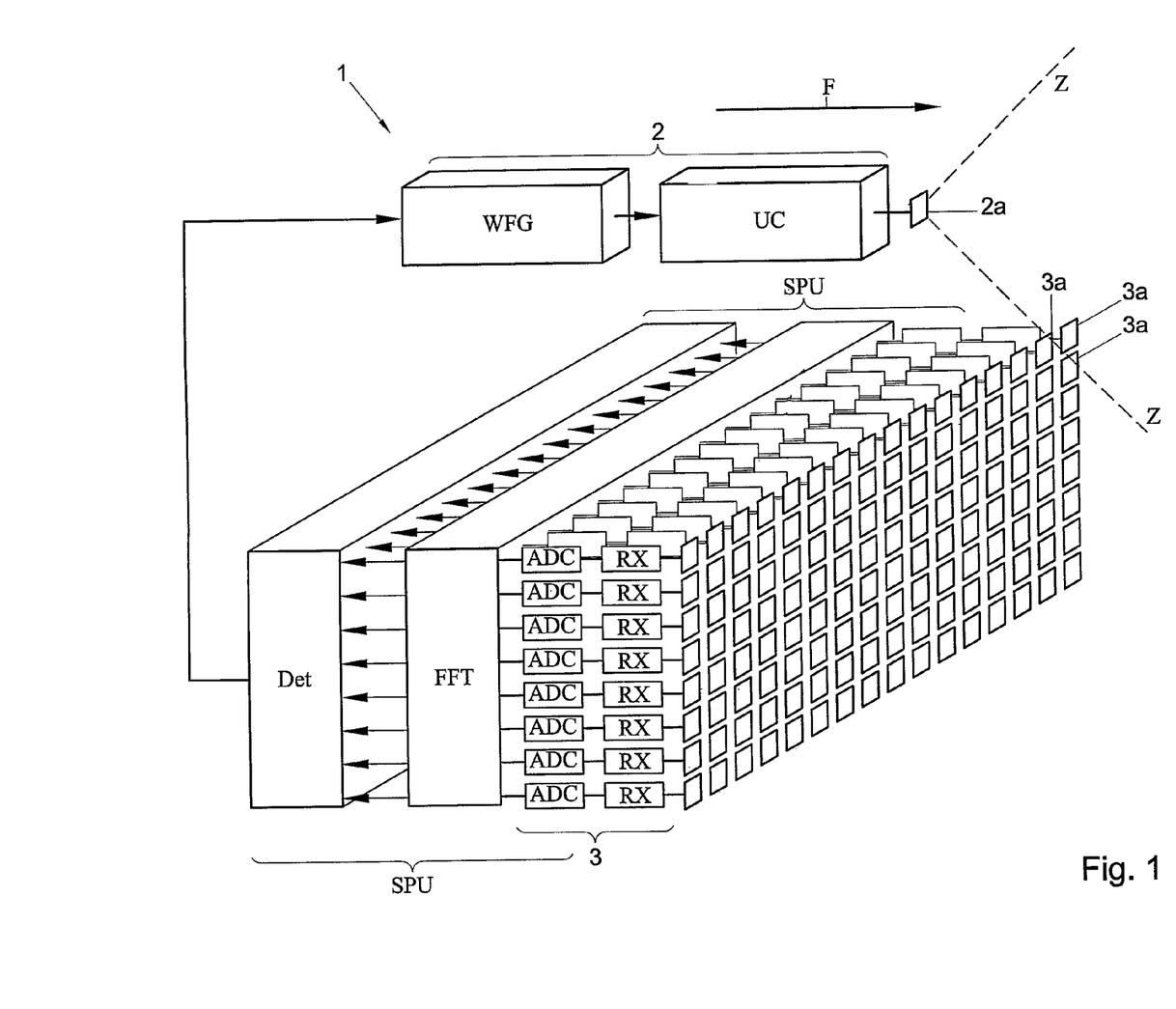
FIG. 1 schematically depicts an embodiment of a radar system according to the invention.

FIG. 1 depicts schematically an embodiment of a radar system for an aircraft for in use at least detecting another airborne object within a region surrounding the aircraft.

DETAILED DESCRIPTION OF THE INVENTION

An aircraft may be an airplane, a helicopter, a zeppelin etc. An airborne object may be any structure or device that reflects electromagnetic radiation and may cause an accident when colliding with the aircraft.

The system comprises at least one subsystem 1. The subsystem 1 comprises a transmitter 2 for transmitting an electromagnetic probe signal into a zone of interest and a phased array of receivers 3 for simultaneously receiving reflections of the transmitted probe signal and for generating receiving signals which each represent a received reflection of the probe signal. The subsystem is arranged to transmit by means of the transmitter the probe signal such that it covers a zone of interest that is static with respect to the aircraft. It is for instance possible that a transmitter antenna 2a is attached to a nose of the aircraft, that the aircraft flies in a direction F, and that the transmitter antenna 2a sends in use a probe signal that is substantially forwardly directed into a zone of interest, such as a cone defined by lines Z. Once the transmitter antenna is in operation, the transmitting antenna 2a is not mechanically moved with respect to the aircraft. The zone of interest, as defined by lines Z is static with respect to the aircraft. Although not visible from FIG. 1 in use the direction of the probe signal is static relative to the aircraft. The subsystem is arranged to transmit the probe signal such that the probe signal continuously covers the zone of interest.

The radar system schematically depicted in FIG. 1 comprises a subsystem 1 which has a phased array of receivers arranged in 8 rows and 16 columns. The subsystem further comprises signal processing means to be discussed later. The receivers 3 are depicted as comprising a receiving antenna 3a, and an electronic element RX for transferring receiving signals further in the subsystem. It will be clear that at least one receiver 3 should be present in each subsystem to enable the subsystem to detect the presence of an airborne object in the zone of interest. However to establish a direction of an airborne device present in the zone of interest at least two receivers should be present. The signal processing means, to be discussed later are arranged for obtaining information of a detected airborne object to the aircraft in at least one dimension. Preferably each subsystem comprises at least three receivers for receiving a reflection of the probe signal that is transmitted by the transmitter antenna 2 of that subsystem. The signal processing means, to be discussed later, are arranged for obtaining information of a detected airborne object relative to the aircraft in at least two dimensions. As shown, the receivers 3 are arranged with respect to each other according to a predetermined pattern that extends in at least two dimensions. It is possible that each of the receivers 3 is within the predetermined pattern with respect to each nearest neighbouring receiver 3 equidistantly arranged. Preferably, such a distance corresponds more or less to half the wavelength of the probe signal that is transmitted by the transmitter antenna 2 of the subsystem.

The subsystem 1 comprises a signal processing unit SPU for processing each of the receiving signals for obtaining information about a detected airborne object within the region surrounding the aircraft. Signal processing unit and signal processing means are interchangeably used in this specification.

The subsystem 1 may be arranged to convert for each receiver 3 of that subsystem a received analogue reflection signed into a digital reflection signal. As shown in FIG. 1 for this purpose each receiver of the at least one subsystem comprises an analogue-to-digital converter (ADC). The subsystem 1 may further comprise a Fourier transformer (FFT), for Fast Fourier transforming the digital reflection signals of all the receivers 3 of that subsystem. The output signal of the FFT comprises information about the direction of the approaching aircraft relative to the receivers 3. The subsystem may further comprise a detector Det for detecting on the basis of the output signals of the FFT the presence of an approaching aircraft as well as the direction of the approaching aircraft relative to the receivers 3. The subsystem is thus arranged to detect by means of the phased array of receivers and the signal processing means an airborne object in the zone of interest irrespective of the position of the airborne object which object is located within the zone of interest. In this embodiment, the signal processing unit can determine the direction relative to the aircraft, from which direction the received reflection originates, irrespective of the position of the detected airborne object, within the zone of interest. In order to achieve this, the signal processing unit is arranged to use digital multiple beam forming by means of the FFT. It is, in this embodiment, unnecessary for the receivers 3 and/or the signal processing unit to scan the zone of interest. The subsystem merely "stares", as it were, at at least nearly the entire zone of interest while refraining from scanning. Each of the receivers may comprise a single chip receiver. These types of single chip receivers are for instance used in wireless local area networks (LAN). As well known to those skilled in the art.

Transmitter 2 of a subsystem may comprise a solid state transmitter as commercially available and well-known by those skilled in the art. Such a solid state transmitter may be arranged to transmit a signal having a constant frequency, of say 10 GHz. Such a solid state transmitter may also be arranged to transmit a signal having a Frequency Modulated Continuous Wave (FMCW). Transmitter 2 may be equipped with a Wave Form Generator WFG and for instance an up-convertor UC for respectively determining the type of signal to be transmitted by the transmitter 2 and addressing this signal suitably to the transmitter antenna 2a. The Detector Det may be arranged to control the Wave Form Generator as will further be discussed below. Subsystem 1 may be arranged such that in use the transmitter of that subsystem 1 transmits a signal having a constant frequency until the subsystem indicates the presence of an approaching aircraft in the zone of interest. The subsystem may further be arranged such that when in use the subsystem indicates the presence of and approaching aircraft in the zone of interest, the transmitter of that subsystem transmits a signal having a Frequency Modulated Continuous Wave (FMCW). That subsystem may further be arranged to repeat transmitting a signal having a frequency modulated continuous wave so that the track of the approaching aircraft can be calculated. The Frequency Modulated Continuous Wave comprises a frequency pattern which receives itself in time. Preferably the radar system comprises at least two subsystems 1 for monitoring a first zone in front of the aircraft and a second zone that is either behind the aircraft, above the aircraft, below the aircraft, or sideways of the aircraft.

Figure 2:
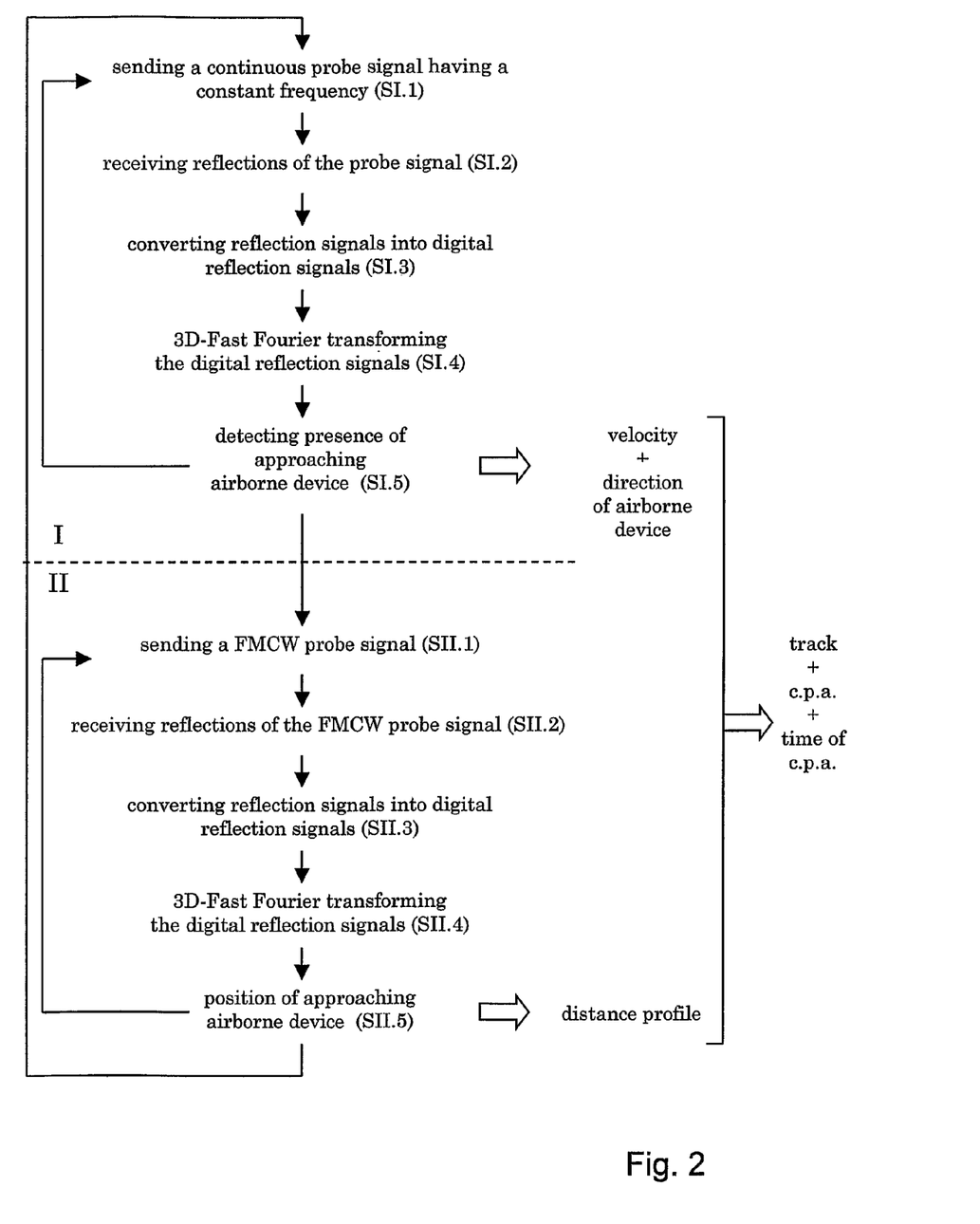
FIG. 2 depicts schematically an embodiment of a method according to the invention.

An embodiment of the radar system according to the invention of which a subsystem is shown in FIG. 1, works as outlined below. FIG. 2 is schematically outlined a method of detecting an aircraft within a region that surrounds an aircraft that is provided with a radar system according to the invention. The method involves, in normal operation, transmitting a continuous probe signal having a constant frequency. This is step SI.1 of a method according to the invention. SI refers to a step in a first mode of operation. A subsystem as shown in FIG. 1 is capable of transmitting such a continuous probe signal. Such a frequency may for instance be 10 GHz, i.e. a signal having a wavelength of about 3 cm. A next step in the embodiment of a method shown in FIG. 2, comprises receiving reflections of the probe signal (SI.2). In the embodiment shown in FIG. 1 the receivers 3 comprise receiving elements 3a for receiving these reflection signals. A next step in the embodiment shown in FIG. 2 comprises converting the receiving signals into digital receiving signals (SI.3). In the embodiment shown in FIG. 1 each receiver comprises for that purpose an analogue-to-digital converter (ADC). In a next step of the embodiment of a method according to the invention each of the digital receiving signals is input of a 3-D Fast Fourier transformer so that each of the digital receiving signals is Fourier transformed in three dimensions, the three dimensions being two spatial dimensions and one temporal dimension. The 3-D Fast Fourier transformer comprises a 2-D Fast Fourier transformer for forming digital multiple beams using a 2-D Fast Fourier transformer for forming digital multiple beams, the forming of these beams resulting from the phase difference between the receiving antennas 3a. Hence, the inputs of the 2-D Fast Fourier transformer are provided by the receiving antennas 3a. Also, Fast Fourier transformer comprises a 1-D Fast Fourier transformer for determining the Doppler frequency. Hence, the input of the 1-D Fast Fourier transformer may be provided by only one of the receiving antennas. From this Doppler spectrum, it is, for each received signal, possible to detect (SI.5) the presence of an approaching airborne object in the zone of interest from which reflections of the probe signal have been received. Thus, it is possible to derive the velocity and the direction of the detected airborne device. The signal processing means are arranged for obtaining information about a velocity of a detected airborne object relative to the aircraft on the basis of doppler information in the reflections of the probe signal. It will be clear to those skilled in the art that stationary reflections, of for instance the ground, can be suppressed on the basis of the Doppler frequency. If no approaching airborne device is detected the transmission of a continuous probe signal having a constant frequency continues until an airborne device is detected.

When an approaching airborne device is detected, the next step comprises transmitting a frequency modulated continuous wave probe signal (SII.1). SII refers to a step in a second mode of operation. Reflections of also this probe signal will be received (SII.2). These receiving signals will be converted into digital receiving signals (SII.3) and a 3-D Fast Fourier transformer will transform all the digital receiving signals (SII.4) in three dimensions, the three dimensions being two spatial dimensions and one temporal dimension. The 3-D Fast Fourier transformer uses a 2-D Fast Fourier transformer for forming digital multiple beams, the forming of these beams resulting from the phase difference between the receiving antennas 3a. Hence, the inputs of the 2-D Fast Fourier transformer are provided by the receiving antennas 3*a*. The transformed signals provide information of the direction of the approaching aircraft relative to the receivers 3. The signal processing means are thereby arranged to determine a direction relative to the aircraft, from which direction the receiving signals originate. Also, the 3-D Fast Fourier transformer comprises a 1-D-Fast Fourier transformer for determining the distance of the approaching airborne device. Hence, the input of the 1-D Fast Fourier transformer may be provided by only one of the receiving antennas. After repeating the sending of a frequency modulated continuous wave probe signal and successively step SII.2, step SII.3 and step SII.4, a number of times, a distance profile of the detected airborne object will be derived. The frequency modulated continuous waves may have a bandwidth of the order of a couple of MHz. The repetition frequency of a frequency modulated continuous wave sweep can be selected such that stationary reflections will not disturb the distance measurement. From the carrying out of steps SI.1-SI.5 the velocity and the direction of the detected airborne object is derived. From the carrying out of steps SI.1-SI.5 a distance profile of the detected airborne object is derived. This allows the radar system to calculate a track of the approaching airborne device and to calculate the closest point of approach (CPA) and the time of the CPA. On the basis of this a pilot can, if needed, carry out an anticollision manoeuvre.

Once the CPA is calculated the subsystem, the subsystem can start again transmitting a continuous probe signal having a constant frequency.

It will be clear that each subsystem can be seen as a "staring radar system" as opposed to a "scanning radar system" known in the prior art.

Figure 3:
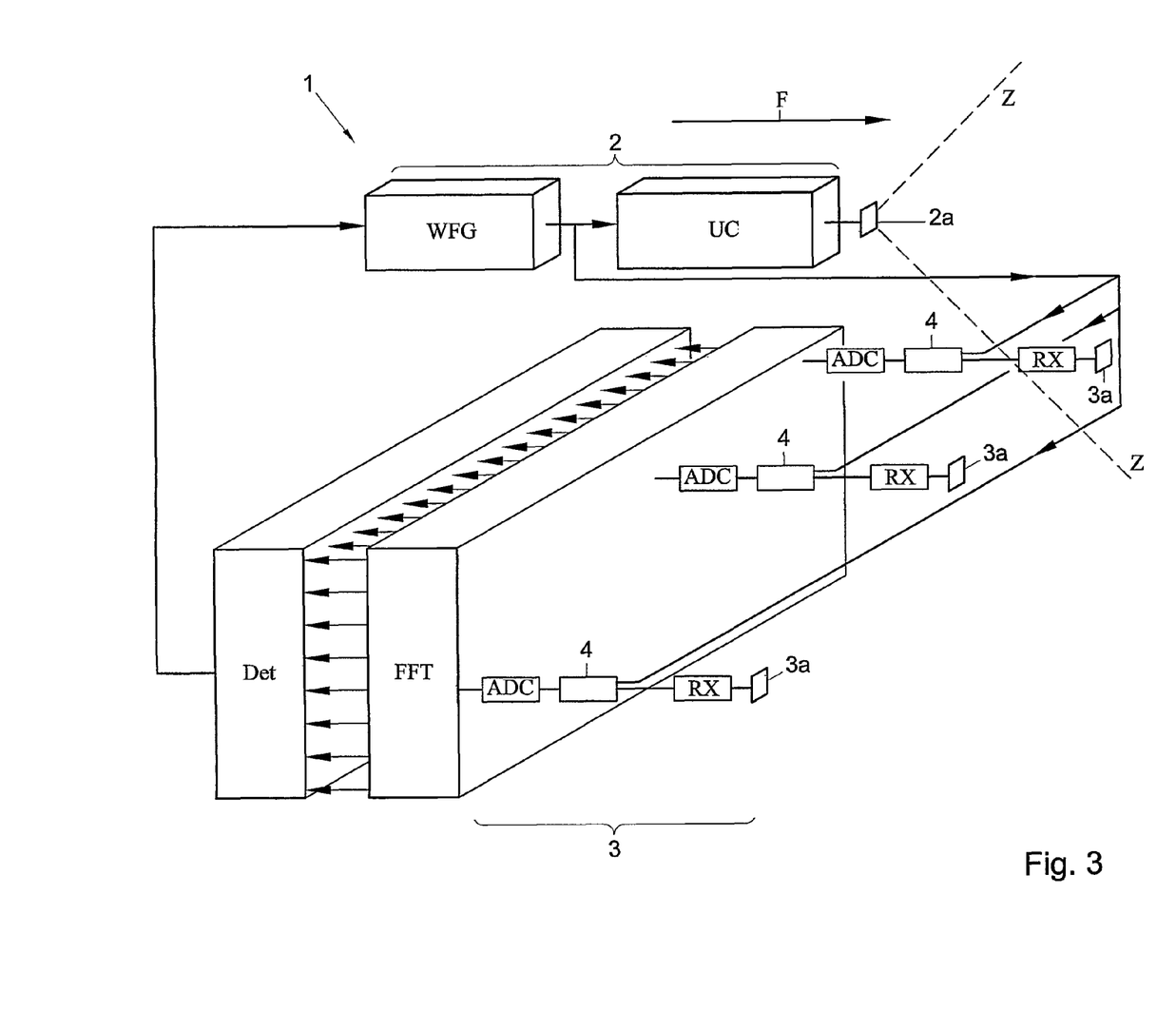
FIG. 3 schematically depicts a modification of the embodiment of the radar system shown in FIG. 1.

A modification of the embodiment shown in FIG. 1 is shown schematically in FIG. 3. The phased array comprises the same amount of receivers 3 as the phased array shown in FIG. 1. However, all but three of the receivers 3 are shown in FIG. 3 for the sake of clarity. As can be seen in FIG. 3, the receivers 3 each comprise a mixer 4. The mixers 4 are located between the electronic element RX and the analogue-to-digital converter (ADC). Furthermore, the mixers 4 are arranged to generate as an output signal a mixer signal having a frequency which at least approximately equals the difference between the frequencies of two input signals. The subsystem is arranged to send a reference signal to the mixers 4 which reference signal is similar to the probe signal to be sent by the transmitter antenna 2. Therefore, the mixer signals are signals of which the frequency equals the difference between the frequencies of the reference signal and the receiving reflection.

Figure 4:
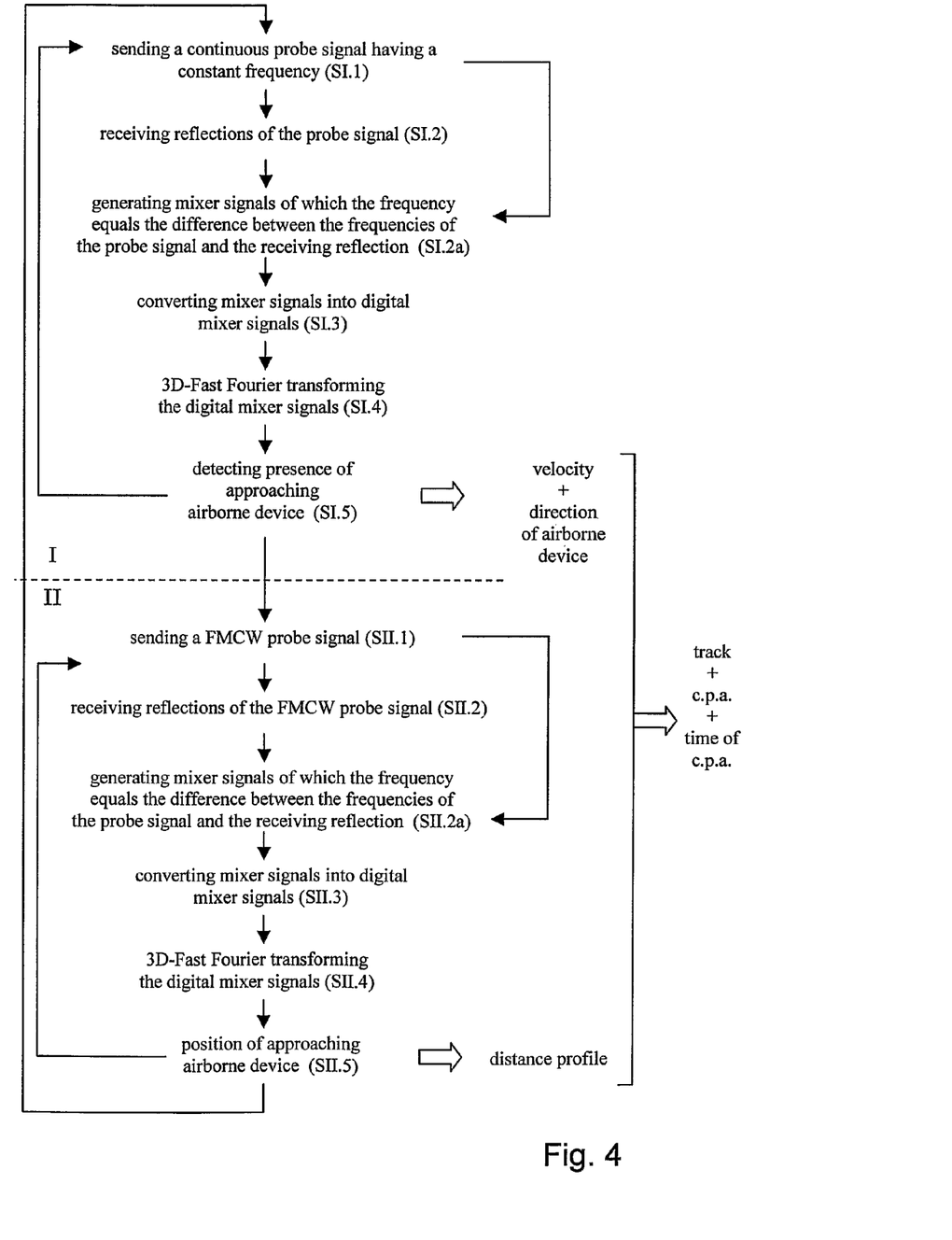
FIG. 4 depicts schematically use of the embodiment of the radar system shown in FIG. 3.

The modification is further illustrated in FIG. 4, in which an extra steps SI.2*a* and SII.2*a* are added. By adding the mixer 4 in the radar system and by adding the extra steps SI.2*a* and SII.2*a*, the respective signals to be converted SI.3 and SII.3 by the analogue-to-digital converters (ADC) are within a range for which range analogue-to-digital converters are available at very reasonable price. Typically, both the reference signal and the receiving reflection have a frequency of about $10^{10}$ Hz range. The mixer signal, however, may very well be about $10^4$ Hz range, for which relatively simple analogue-to-digital converters are available.

Figure 5:
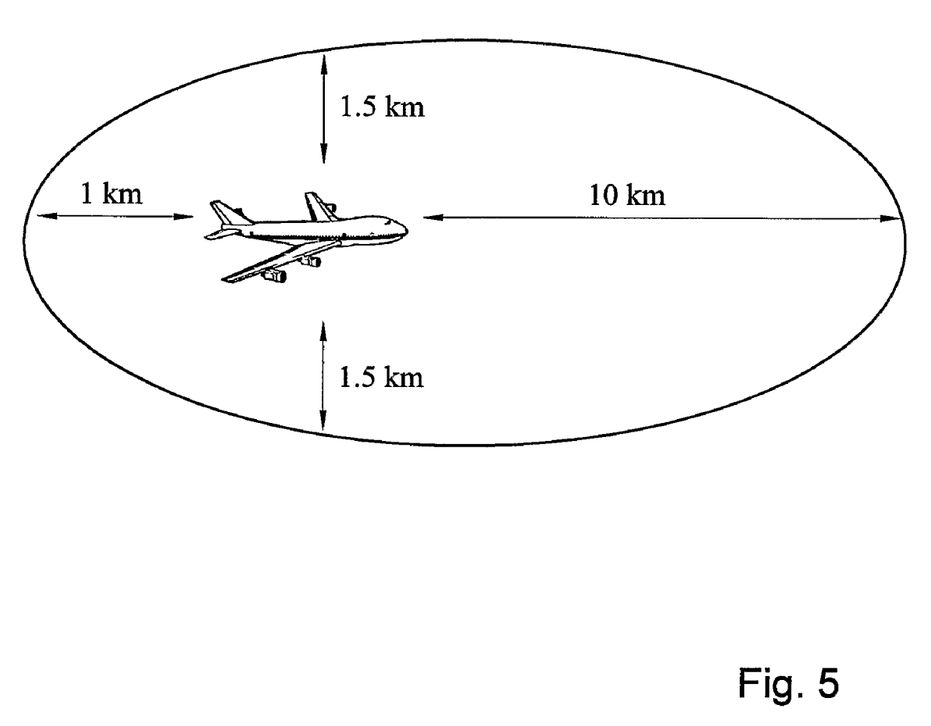
FIG. 5 depicts schematically a result for an aircraft that is provided with an embodiment of a radar system according to the invention.

FIG. 5 shows schematically how an aircraft such as an airplane may be provided with a radar system comprising a number of subsystems such that a static zone of interest is covered by the probe signal in front of the airplane. The zone extends to approximately 10 km away from the airplane. A static zone of interest covered by a probe signal is present behind the airplane and extends to approximately 1 km away from the aircraft. A static zone of interest covered by a probe signal is present both above and below the aircraft and extends approximately 1.5 km from the aircraft.

It is also conceivable that a zone of interest is present on either side of the airplane. Each zone of interest requires its own subsystem. It is also possible that each subsystem comprises two transmitter antennas, namely one for continuously transmitting a probe signal having a constant frequency and one for transmitting continuously a probe signal having a FMCW. In this case detecting and determining distance of a detected airplane are not mutually exclusive but can be done simultaneously so that also new airborne objects can be detected when the distance of an already detected object is determined. It is possible though that zones of interest overlap. Such embodiments are all understood to fall within the framework of the invention.

What is claimed is:

1. A radar subsystem for an aircraft for detecting another airborne object within a region surrounding the aircraft, the subsystem comprising:
   at least one transmitter for transmitting an electromagnetic probe signal;
   a phased array of receivers for simultaneously receiving reflections of the probe signal transmitted by the at least one transmitter and for generating receiving signals which each represent a received reflection of the probe signal; and
   a signal processing unit for processing each of the receiving signals, the signal processing unit operatively coupled to the phased array of receivers for obtaining information about a detected airborne object within the region surrounding the aircraft, the probe signal configured to cover a zone of interest, the zone of interest being static with respect to the aircraft, the information about the detected airborne object including whether the an airborne object is in the zone of interest, the signal processing unit configured to determine a direction relative to the aircraft, from which the received reflection originates, while the receivers and/or the signal processing unit refrain from scanning the zone of interest so that the zone of interest is observed as a whole, the signal processing unit configured to perform a Fast Fourier Transform on the receiving signals for forming digital multiple beams, wherein in a first mode the probe signal having a constant frequency and in a second mode the probe signal having a Frequency Modulated Continuous Wave.

2. The radar subsystem according to claim 1, wherein the probe signal is configured to continuously cover the zone of interest.

3. The radar subsystem according to claim 1, wherein the signal processing unit is configured to determine the direction irrespective of the position of the detected airborne object within the zone of interest for observing the zone of interest as a whole.

4. The radar subsystem according to claim 1, wherein the digital multiple beams are used for determining the direction relative to the aircraft, from which the received reflection originates.

5. The radar subsystem according to claim 1, wherein a direction of the probe signal is static relative to the aircraft.

6. The radar subsystem according to claim 1, wherein the signal processing unit is configured to detect a direction of the detected airborne object relative to the aircraft in at least one dimension.

7. The radar subsystem according to claim 6, wherein the signal processing unit is configured to detect a direction of the detected airborne device relative to the aircraft in at least two dimensions.

8. The radar subsystem according to claim 1, wherein the signal processing unit is configured to determine a position of the detected airborne object relative to the aircraft.

9. The radar subsystem according to claim 8, wherein the Frequency Modulated Continuous Wave comprises a frequency pattern which repeats itself in time.

10. An aircraft, provided with a radar subsystem according to claim 1.

11. The radar subsystem according to claim 1, wherein the signal processing unit is configured to determine a velocity of the detected airborne object relative to the aircraft on the basis of doppler information in the reflections of the probe signal.

12. The radar subsystem according to claim 1, wherein the at least one transmitter includes a solid state transmitter.

13. The radar subsystem according to claim 1, wherein each receiver includes a single-chip receiver.

14. The radar subsystem according to claim 1, wherein if in the first mode the airborne object is detected, the airborne object is further detected in the second mode.

15. The radar subsystem according to claim 14, wherein if in the first mode an airborne object is detected which approaches the aircraft, the probe signal changes from the first mode to the second mode.

16. The radar subsystem according to claim 14, wherein the Frequency Modulated Continuous Wave comprises a frequency pattern which repeats itself in time.

17. The radar subsystem according to claim 1, wherein the Frequency Modulated Continuous Wave comprises a frequency pattern which repeats itself in time.

18. The radar subsystem according to claim 1, wherein the zone of interest includes at least one of a first zone in front of the aircraft and at least a second zone that is either behind the aircraft, above the aircraft, or below the aircraft.

* * * * *